INVENTOR.
ALEX CIECHANOWSKI

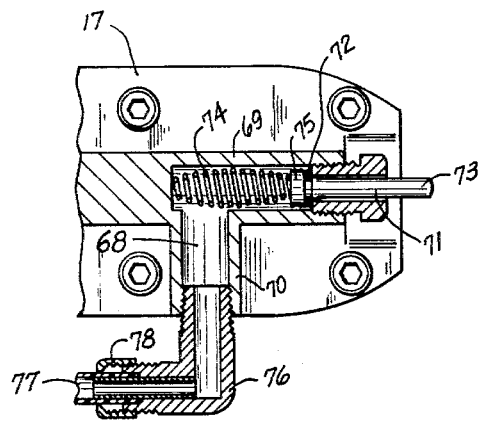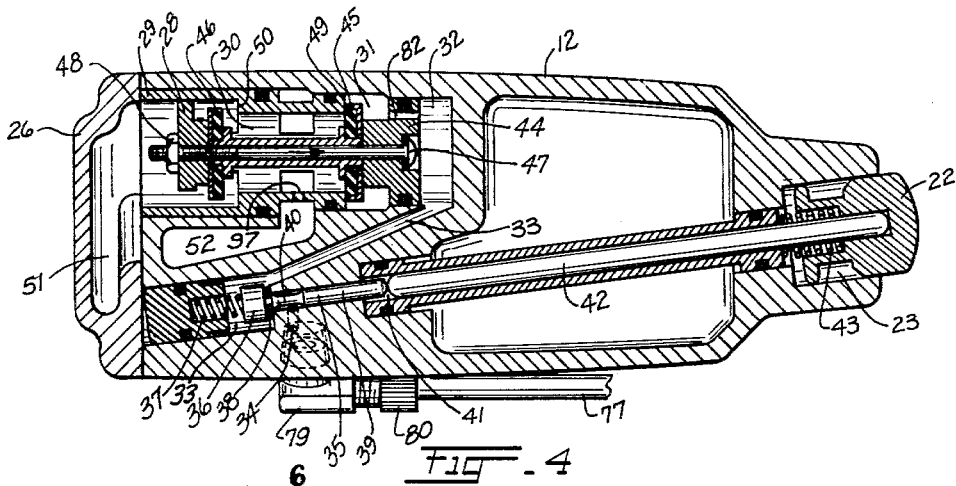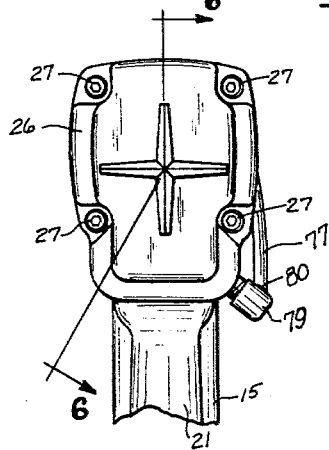

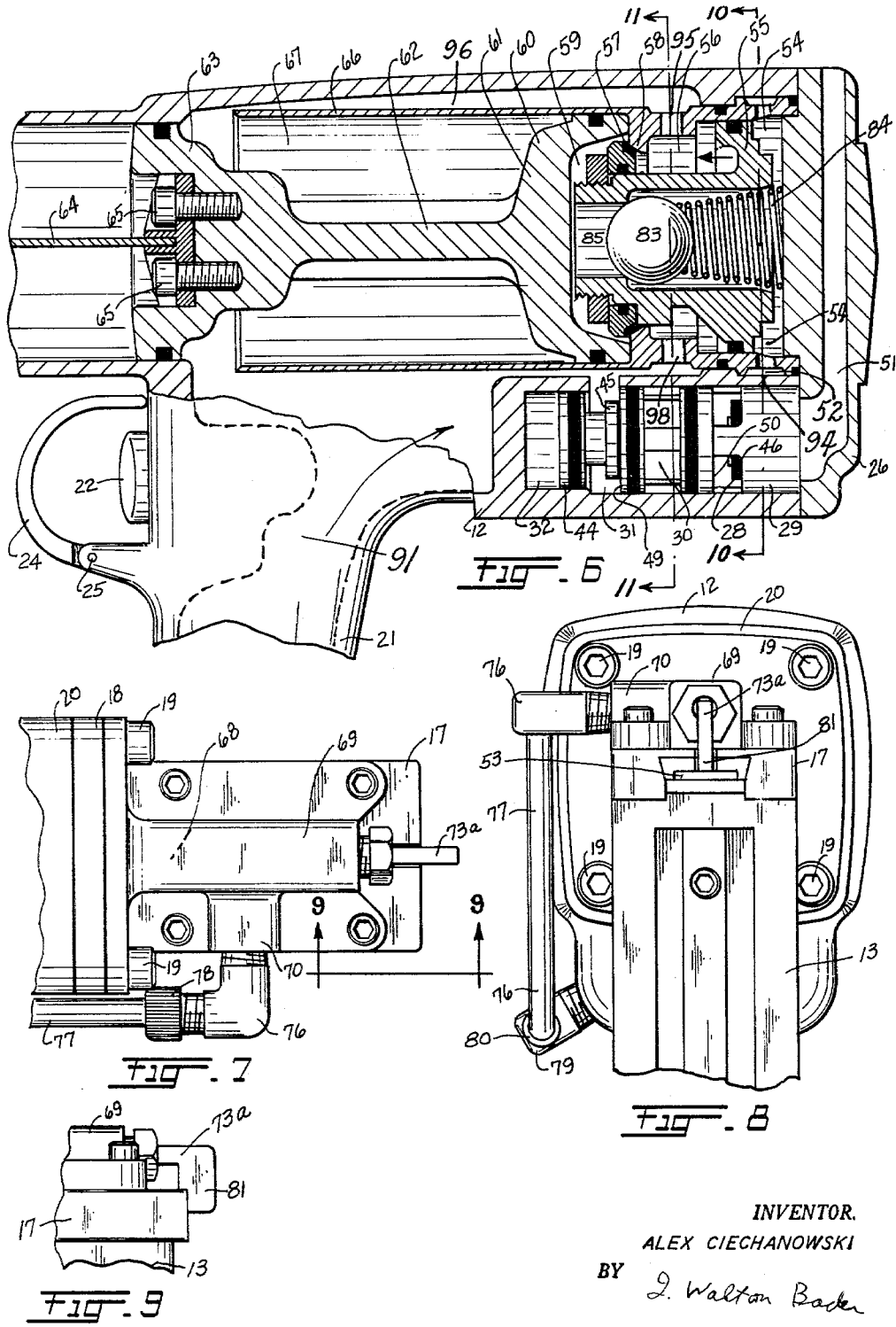

May 24, 1966 A. CIECHANOWSKI 3,252,641
SAFETY DEVICE FOR FLUID ACTUATED FASTENER DRIVING MACHINES
Filed June 7, 1961 4 Sheets-Sheet 4

INVENTOR.
ALEX CIECHANOWSKI
BY
ATTORNEY

United States Patent Office 3,252,641
Patented May 24, 1966

3,252,641
SAFETY DEVICE FOR FLUID ACTUATED
FASTENER DRIVING MACHINES
Alex Ciechanowski, East Meadow, N.Y., assignor to Speedfast Corporation, Long Island City, N.Y., a corporation of New York
Filed June 7, 1961, Ser. No. 115,870
13 Claims. (Cl. 227—8)

This invention relates to a safety device for fluid actuated fastener driving machines and has particular application to pneumatically operated fastener driving machines which utilize a pilot valve to actuate the driving means of the machine. Such devices are illustrated, for example, in the United States Patent No. 2,854,953 issued to Lloyd M. Osborne.

Fluid actuated fastener driving machines generally have considerable driving power. This power is necessary so that long fasteners, such as staple or nails or the like can be driven, in one blow, into a hard material such as oak wood, soft metals, and the like. Unfortunately, if the operator of the device is careless, a fastener may be propelled from such device into the body of a fellow workman, thereby causing serious injury.

For the obvious reasons of worker protection, therefore, a number of states and municipalities have required that any fluid actuated fastener driving machine utilized by factory workmen must have some means thereupon to prevent actuation of the device unless the machine is in contact with the work into which a fastener is to be driven.

Conventional safety devices for this type of machine, however, have been generally unsatisfactory since they generally operate by blocking the discharge means of the machine by some mechanical block. With this type of device, while actuation is prevented unless the discharge means are in contact with the work, improper actuation will cause serious injury to the machine.

The instant invention, on the other hand, will cause the fastener driving machine to be inoperative unless the discharge means are in contact with the work. However, if the device is improperly actuated, it simply will not fire and will not be damaged.

The safety device of the instant invention, in addition, in its preferred modification, can also serve as automatic means for actuating the fastening machine when such fastening machine is brought in contact with the work, so that automatic fastening can be performed.

The safety device of the instant invention is also simple and inexpensive to manufacture and is positive in action at all times.

Other objects and advantages of the instant invention will become apparent to the reader of this specification.

The safety device of the instant invention is utilized in connection with a fluid operated fastening device having fluid inlet means, fluid exhaust means and intervening driving means and comprises blocking means for fluid between the driving means and the fluid inlet means. In the preferred modification of this invention the fastening device is pneumatically operated and includes main pressure air inlet and exhaust means, driving means actuated by the pressure air and driving means return means, and a body portion having a nose thereupon. The invention comprises a pilot valve and a pilot valve housing within the body, the pilot valve being normally closed and preventing pressure air from reaching the driving means of the fastening device when the pilot valve is in closed position.

The pilot valve housing is divided into a lower chamber normally filled with pressure air, an intermediate chamber, and an upper chamber normally open to atmosphere. The pilot valve is formed with a lower portion adjacent the lower chamber, an intermediate portion of smaller operational area than that of the lower portion and adjacent the intermediate chamber, and an upper portion adjacent the upper chamber.

The lower portion of the pilot valve, in closed position, prevents pressure air from reaching the driving means and the upper portion of the pilot valve, in open position, preventing pressure air from escaping to atmosphere through the upper chamber.

A control valve channel is provided which has an exhaust opening therewithin and communicates between the lower chamber of the pilot valve housing and the exhaust opening. A normally closed but openable control valve is disposed within the control valve channel and normally blocks communication between the pilot valve housing and the exhaust opening. An openable but normally closed safety valve is disposed adjacent the nose portion of the body of the device and normally has a portion projecting therefrom, and an air exhaust conduit is disposed between the pilot valve exhaust opening and the safety valve.

Specifically, also, as this specification will show, further specific constructional details may also be employed in order to obtain the best possible device but these specific constructional details are not essential for the operation of this invention.

The invention will be further described by reference to the accompanying drawings which are made a part of this specification.

FIG. 3 is a sectional view of the nose portion of the fastener driving machine equipped with the safety device of this invention taken along lines 3—3 of FIG. 1.

FIG. 4 is a sectional view of a portion of the body casing of the fastener driving machine equipped with the safety device of this invention taken along lines 4—4 of FIG. 1.

FIG. 5 is a top view of the device shown in FIG. 1 with the projecting handle of the device broken away for clarity of illustration.

FIG. 6 is a sectional view through the body casing of a fluid actuated fastener driving machine to which the safety device of this invention is attached, taken along lines 6—6 of FIG. 5.

FIG. 7 is an enlarged detail view of the nose portion of a fluid actuated fastener driving device to which the safety device of this invention is attached. In this figure the form of stem portion of the safety valve of this device is that shown in FIG. 8.

FIG. 8 is a bottom plan view of a fluid actuated fastener driving device with an alternative form of stem member of the safety valve which is utilized when it is desired to actuate the fastener driving machine automatically and serves to properly position the device upon the work.

FIG. 9 is a detail view of the alternative form of the stem member shown in FIG. 8.

Figure 1:
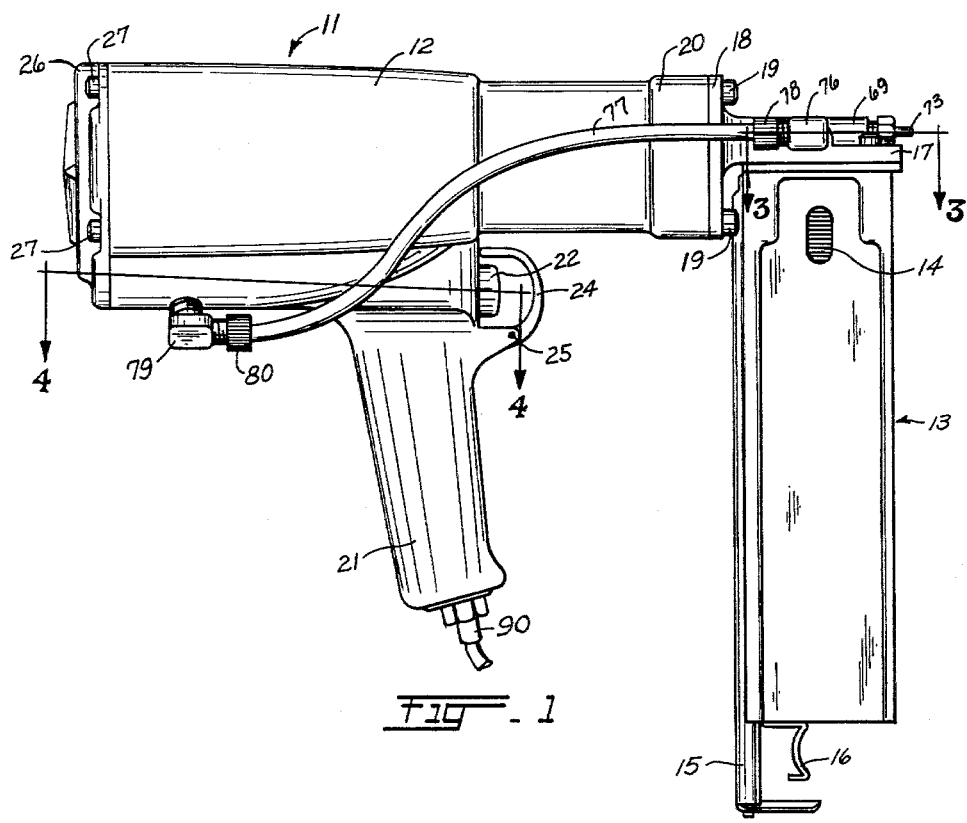
FIG. 1 is a side view of a fluid actuated fastener driving machine having the safety device of this invention disposed thereupon.
Figure 2:
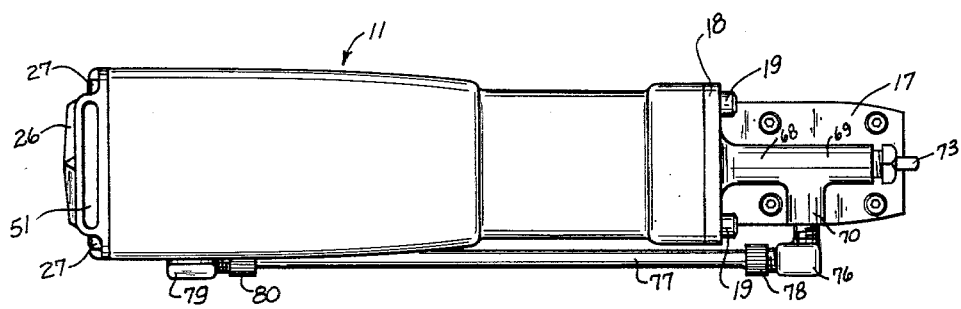
FIG. 2 is a front view of the device shown in FIG. 1.
Figure 10:
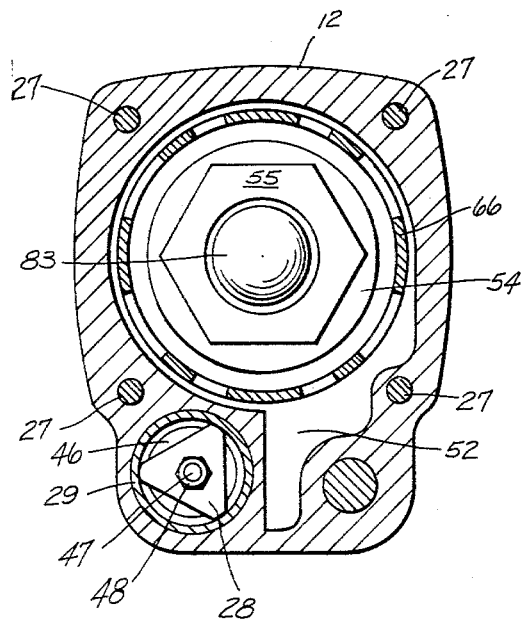
FIG. 10 is a sectional view of the fastening device used in connection with this invention taken along lines 10—10 of FIG. 6.
Figure 11:
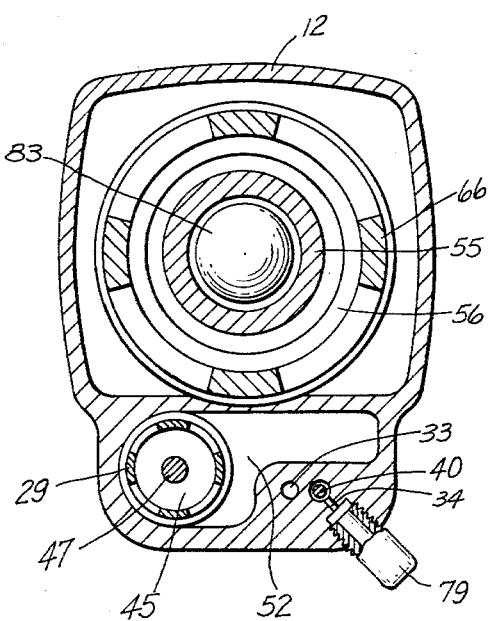
FIG. 11 is a sectional view of the device set forth in FIG. 10 taken along lines 11—11 of FIG. 6.

Now referring to the forms of the invention shown in the accompanying drawings for a detailed description thereof the fastening device 11, which generally follows the principle of operation of the United States Patent 2,854,953 of Lloyd M. Osborne, is formed with a body casing 12 and a magazine 13. Magazine 13 is adapted to hold fasteners 14 and has a slidable cover 15 overlying the same and a lock 16 which holds said cover in position. The magazine is substantially similar to the magazine disclosed in the patent application of Seymour Pazan, Serial No. 20,471, filed April 6, 1960 in the United States Patent Office now United States Patent No. 3,037,207 issued June 5, 1962.

Magazine 13 also has a nose portion 17 which is provided with a discharge opening for expelling of fasteners (not shown) and a support portion 18 which abuts the lower portion 20 of body casing 12 and is held to casing 12 by bolts 19.

Body casing 12 is also formed with a projecting handle 21. Handle 21 is hollow and is provided with a channel 91 having an inlet connection 90. Channel 91 and connection 90 constitute one form of air inlet means. A control valve handle 22 also projects from a recess 23 within body casing 12. A guard 24 is pivoted at 25 and surrounds control valve handle 22. A cap 26 is secured to the top of body casing 12 by screws 27.

A pilot valve 28 is disposed within pilot valve housing 29 located within body casing 12. Pilot valve housing 29 is divided into an upper chamber 30, an intermediate chamber 31 and a lower chamber 32. Chambers 30, 31 and 32 normally communicate with one another but the communication is selectively blocked by portions 45 and 46 of pilot valve 28. A first control valve channel 33 is provided with an exhaust opening 34. Control valve channel 33 extends between exhaust opening 34 and lower chamber 32 of pilot valve housing 29.

A first control valve 35 is formed with a head 36, a rubber disk 38 beneath head 36 and a stem portion 39 which bears a reduced portion 40 thereupon. A spring 37 is disposed above head 36. First control valve 35 is disposed within first control valve channel 33 and normally blocks communication between lower chamber 32 of pilot valve housing 29 and exhaust opening 34.

A second control valve channel 41 is also provided. Stem portion 39 of first control valve 35 extends into channel 41 and abuts actuating rod 42 located therewithin. Rod 42 also has a spring 43 thereupon surrounding its lower portion and is secured to control valve handle 22. Handle 22, rod 42, and spring 43 constitute what is termed a "second control member" in the claims.

Pilot valve 28 is formed with a lower portion 44, an intermediate portion 45 and a top portion 46. Portions 44, 45, and 46 of pilot valve 28 are secured to one another by bolt 47 bearing nut 48 thereupon. When pilot valve 28 is in normal position (as shown in FIG. 4) intermediate portion 45 abuts stop 49 and upper portion 46 is clear of stop 50. Thus upper chamber 30 is in communication with atmosphere through channel 51 of cap 26.

Upper chamber 30 of pilot valve 28 also communicates with conduit 52 which in turn communicates through the device with space 54 above poppet valve 55 through port 94. Space 54 is formed between valve 55 and sleeve 66. Seal 57 bears against shoulder 58 and normally keeps pressure air out of space 59 above main drive piston 60.

Drive piston 60 is formed with an upper element 61 and a stem portion 62. A lower element 63 is attached to stem 62 and in turn is secured to driver blade 64 by screws 65.

Piston 60 moves in sleeve 66 and a space 67 is provided within sleeve 66.

Nose portion 17 of magazine 13 is formed with a substantially right-angled safety valve channel 68 which is in turn formed with a vertical portion 69 and a horizontal portion 70. A safety valve 71 is partially disposed within vertical portion 69 of channel 68 and is formed with a head 75, a seal ring 72 and a projecting stem 73. Stem 73 is adapted to be placed in contact with the work into which a fastener is to be driven by the device.

A spring 74 is disposed above head 75 and normally maintains safety valve 71 in closed position.

An elbow 76 is attached to horizontal portion 70 of channel 68. A flexible conduit 77 is secured to elbow 76 by means of nut 78.

An additional elbow 79 is disposed about exhaust opening 34 of first control valve channel 33 and conduit 77 is secured to elbow 79 by nut 80.

FIGS. 7, 8 and 9 show a slightly modified form of stem portion of safety valve 71 of the instant device. In these figures stems 73a bears an inwardly offset portion 81. This construction is very useful in obtaining semi-automatic operation of the fastening device of the instant invention as will be subsequently explained.

With the foregoing specific description the operation of this invention will now be explained.

The fastening device is prepared for operation by opening lock 16 and sliding cover 15 of magazine 13 rearwardly so as to expose the magazine. A plurality of fasteners in adhered relationship such as nails, staples, corrugated fasteners, or the like are dropped into magazine 13 and cover 15 sealed to its forward position and locked in place. The fastening device 11 is then connected to a source of pressure air through connector 90 in this position, with the device in inoperative position, first control valve 35 is in closed position and blocks communication between lower chamber 32 of pilot valve housing and exhaust opening 34. It must also be noted that exhaust opening 34 is not open to atmosphere but is closed by safety valve 71 and this opening will not be open to atmosphere unless stem portion 73 of control valve 71 is depressed in contact with the work into which a fastener is to be driven.

In this normal rest position of the device the parts assume the positions shown in FIGS. 4 and 6. Pressure air is within lower chamber 32 of pilot valve housing 29 through conduit 91 and channel 52 is open to atmosphere since it is in communication with channel 51. Pressure air is also present in space 56 and in space 67 since pressure air flows from conduit 91 to space 67 and to space 96. Pressure air also flows from space 96 through port 95 to space 56 thereby holding the parts in the position shown. If control valve handle 22 is now depressed so as to move head portion 36 of first control valve 35 upwardly pressure air will now bleed into conduit 77 and against safety valve 71. However, unless stem portion 73 of safety valve 71 is in contact with the work, nothing will happen since no exhaust outlet for the pressure air will be available. Thus, if the control valve handle 22 is accidently pushed without the fastening device being in contact with the work no firing of the device will occur.

Assuming now that nose portion 17 of the fastening device is placed in contact with the work and stem 73 pushed rearwardly so as to open safety valve 71 and if, at the same time, first control valve 35 is opened then pressure air will leave lower chamber 32 of pilot valve housing 29 hereby causing a reduction in pressure in this chamber. Intermediate chamber 31 of pilot valve housing 29 also contains pressure air through port 98 and the pressure air from this chamber may bleed in to lower chamber 32 through opening 82.

Since the pressure below lower portion 44 of pilot valve 28 is less than the pressure above such valve the entire assembly moves downwardly in the direction of the arrow in FIG. 4 thereby unseating intermediate portion 45 from stop 49 and permitting pressure air from intermediate chamber 31 to flow into channel 52. At the same time upper portion 46 of pilot valve 28 seats against stop 50 so as to seal channel 52 from atmosphere. Pressure air now flows into space 54 from 52 above poppet valve 55 and, since the operational area of the portion of poppet valve 55 adjacent space 54 is greater than the portion of poppet valve 55 adjacent space 56 poppet valve 54 moves downwardly in the direction of the arrow shown in FIG. 6 and thereby permits pressure air to flow from space 56 to space 59 above piston 60.

It is also noted that ball 83 is disposed within channel 85 which is larger at its upper portion than at its lower portion. The upper portion of channel 85 is in communication with space 54 so that the pressure contained within space 54 forces ball 83 in a downward position and thereby seals channel 85. A spring 84 is disposed above ball 83.

Since the operational area above the upper element 61 of piston 60 is greater than the operational area beneath piston 60 is driven downward with considerable force.

If exhaust opening 34 is thereafter blocked either by the closing of safety valve 71 or of first control valve 35 pressure air will again fill lower chamber 32 of pilot valve housing 29. Since the operational area beneath lower portion 44 is greater than the operational area above such portion the pressure air forces pilot valve 28 into the normal rest position shown in FIG. 4. Pressure air from intermediate chamber 31 can now no longer enter channel 52 since intermediate portion 45 is now sealed against stop 49. The pressure air in space 52 now exhausts to atmosphere through space 51 and thereby causes a reduction of pressure in space 54 above poppet valve 55. Since there is now pressure in space 56 this pressure now acts upwardly and closes communication between space 56 and space 59. The pressure air now contained in space 59 acts against ball 83 since there is now no compensating pressure above ball 83. This pressure unseats ball 83 from its position within channel 85 and causes an exhaust of pressure air to atmosphere. The pressure air now contained within space 67 causes a return of piston 60 and, when the return is completed, spring 84 pushes ball 83 back to its closed position and causes the device to be ready for another cycle.

It can be noted, that, if the operator so desires, he can keep first control valve 35 open and the device will not fire until safety valve 71 is also opened. If therefore, semiautomatic operation of the device is desired, the operator merely keeps control valve handle 22 depressed, aligns the nose portion 17 with the work into which a fastener is to be driven and then pushes stem 73 inwardly so as to drive a fastener. The alignment is greatly improved when stem 73a is employed having its offset portion 81.

The foregoing specific embodiments of the instant invention as set forth in the specification herein are for illustrative purposes and for purposes of example only. Various changes and modifications may obviously be made within the spirit and scope of this invention and would occur to those skilled in this art.

I claim:

1. In a pneumatically operated fastening device having, in operative relationship, air inlet means, openable control valve means, driving means, pilot valve means, pilot valve air exhaust means, and main air exhaust means, a safety device which comprises a normally closed blocking valve intervening said pilot valve air exhaust means, said blocking valve being opened by opening of said control valve and impingement of the work against said fastening device.

2. In a pneumatically operated fastening device having, in operative relationship, air inlet means, main air exhaust means, openable control valve means, a drive piston, means for actuating and returning said drive piston, pilot valve means, and pilot valve air exhaust means, a safety device which comprises a normally closed blocking valve intervening said pilot valve air exhaust means, said blocking valve being opened by opening of said control valve and impingement of the work against said fastening device.

3. In a pneumatically operated fastening device having a body formed with a nose portion thereupon, main air inlet and exhaust means, a drive piston, means for actuating and returning said drive piston, a pilot valve, and a pilot valve housing within said body; a safety device which comprises a control valve channel provided with a pilot valve exhaust opening communicating with said pilot valve housing, a normally closed but openable control valve within said control valve channel normally blocking communication between said pilot valve housing and said exhaust opening, an openable normally closed safety valve secured to the nose portion of said body and normally projecting therefrom, an air exhaust conduit between said pilot valve exhaust opening and said safety valve, wherein said safety valve can be opened only when said fastening device is in contact with material into which a fastener is to be driven.

4. In a pneumatically operated fastening device having a body casing, a magazine for fasteners secured to said casing and having a nose portion thereupon, main air inlet and exhaust means, a drive piston, pneumatic means for actuating and returning said drive piston, a pilot valve and a pilot valve housing within said body; a safety device which comprises a first control valve channel provided with a pilot valve exhaust opening and communicating with said pilot valve housing, a normally closed first openable control valve within said first control valve channel normally blocking communication between said pilot valve housing and said exhaust opening, a second control valve channel angularly disposed to said first control valve channel and communicating therewith, a spring loaded second control member within said second control valve channel adapted to abut said first control valve and open the same, an openable normally closed safety valve secured to the nose portion of said body and normally projecting therefrom, an air exhaust conduit between said pilot valve exhaust opening and said safety valve, wherein said safety valve is opened only when said fastening device is in contact with material into which a fastener is to be driven.

5. In a pneumatically operated fastening device having a body formed with a nose portion thereupon, main pressure air inlet and exhaust means, a drive piston, and means for returning said drive piston actuated by said pressure air; a safety device which comprises a pilot valve and a pilot valve housing within said body, said pilot valve being normally closed and preventing pressure air from reaching said drive piston in said closed position, said pilot valve housing being divided into a lower chamber normally filled with pressure air, an upper chamber normally open to atmosphere, and an intermediate chamber, said pilot valve having a lower portion adjacent said lower chamber, an intermediate portion of smaller operational area than said lower portion adjacent said intermediate chamber, and an upper portion adjacent said upper chamber, a first control valve channel provided with a pilot valve exhaust opening communicating with the lower chamber of said pilot valve housing, a normally closed but openable control valve within said control valve channel normally blocking communication between said pilot valve housing and said exhaust opening, an openable normally closed safety valve secured to the nose portion of said body and normally projecting therefrom, an air exhaust conduit between said pilot valve exhaust opening and said safety valve, wherein said safety valve is opened only when said fastening device is in contact with material into which a fastener is to be driven.

6. In a pneumatically operated fastening device having a body formed with a nose portion thereupon, main pressure air inlet and exhaust means, a drive piston, and means for returning said drive piston actuated by said pressure air; a safety device which comprises a pilot valve and a pilot valve housing within said body, said pilot valve being normally closed and preventing pressure air from reaching said drive piston in said closed position, said pilot valve housing being divided into a lower chamber normally filled with pressure air, an upper chamber normally open to atmosphere and an intermediate chamber, said pilot valve also having a lower portion adjacent said lower chamber, an intermediate portion of smaller operational area than said lower portion adjacent said intermediate chamber, and an upper portion adjacent said upper chamber, said lower portion, in closed position, preventing pressure air from leaving said lower chamber, said upper portion, in open position, preventing pressure air from escaping to atmosphere through said upper chamber; a first control valve channel provided with a pilot valve exhaust opening communicating with said pilot valve housing, a normally closed but openable control valve within said control valve channel normally blocking communication between said pilot valve housing and said exhaust opening, an openable but normally closed safety valve secured to the nose portion of said body and normally projecting therefrom, an air exhaust conduit between said pilot valve exhaust opening and said safety valve, wherein said safety valve is opened only when said fastening device is in contact with material into which a fastener is to be driven.

7. In a pneumatically operated fastening device having a body formed with a nose portion thereupon, main pressure air inlet and exhaust means, a drive piston, and means for returning said drive piston actuated by said pressure air; a safety device which comprises a pilot valve and a pilot valve housing within said body, said pilot valve being normally closed and normally preventing pressure air from reaching said drive piston, said pilot valve housing being divided into a lower chamber normally filled with pressure air and an upper chamber normally open to atmosphere, said pilot valve also having a lower portion adjacent said lower chamber, an intermediate portion of smaller operational area than said lower portion, and an upper portion adjacent said upper chamber, said intermediate portion, in closed position, preventing pressure air from leaving said lower chamber, said upper portion, in open position, preventing air from escaping to atmosphere through said upper chamber; a first control valve channel provided with a pilot valve exhaust opening communicating with said pilot valve housing, a normally closed but openable control valve within said control valve channel normally blocking communication between said pilot valve housing and said exhaust opening, an openable but normally closed safety valve secured to the nose portion of said body and normally projecting therefrom, an air exhaust conduit between said pilot valve exhaust opening and said safety valve, so that said safety valve is opened and said fastening device operated only when said device is in contact with material into which a fastener is to be driven.

8. In a pneumatically operated fastening device having a body formed with a nose portion thereupon, main pressure air inlet and exhaust means, a drive piston and means for returning said drive piston actuated by said pressure air; a safety device which comprises a pilot valve and a pilot valve housing within said body, said pilot valve being normally closed and normally preventing pressure air from reaching said driving means, said pilot valve housing being divided into a lower chamber normally filled with pressure air, an intermediate chamber communicating with said lower chamber, and an upper chamber normally open to atmosphere and also communicating with said drive piston, said pilot valve also having a lower portion adjacent said lower chamber, an intermediate portion of smaller operational area than said lower portion, and an upper portion adjacent said upper chamber, said intermediate portion, in closed position, preventing pressure air from flowing from said intermediate chamber to said upper chamber, said upper portion, in open position, preventing pressure air from escaping to atmosphere through said upper chamber and thereby permitting said pressure air to actuate said driving means, a control valve channel provided with a pilot valve exhaust opening communicating with said pilot valve housing, a normally closed but openable control valve within said control valve channel normally blocking communication between said pilot valve housing and said exhaust opening, an openable but normally closed safety valve secured to the nose portion of said body and normally projecting therefrom, and an air exhaust conduit between said pilot valve exhaust opening and said safety valve, so that said safety valve is opened and said fastening device operated only when said device is in contact with material into which a fastener is to be driven.

9. In a pneumatically operated fastening device having a body casing, a magazine secured to said body casing and having a discharge opening therewithin, main pressure air inlet and exhaust means, a drive piston and means for returning said drive piston actuated by said pressure air; a safety device which comprises a pilot valve and a pilot valve housing within said body, said pilot valve being normally closed and normally preventing pressure air from reaching said driving means, said pilot valve housing being divided into a lower chamber normally filled with pressure air, an intermediate chamber communicating with said lower chamber, and an upper chamber normally open to atmosphere and also communicating with said drive piston, said pilot valve also having a lower portion adjacent said lower chamber, an intermediate portion of smaller operational area than said lower portion, and an upper portion adjacent said upper chamber, said intermediate portion, in closed position, preventing pressure air from flowing from said intermediate chamber to said upper chamber, said upper portion, in open position, preventing pressure air from escaping to atmosphere through said upper chamber and thereby permitting said pressure air to actuate said driving means, a control valve channel provided with a pilot valve exhaust opening communicating with the lower portion of said pilot valve housing, a normally closed but openable control valve within said control valve channel normally blocking communication between said pilot valve housing and said exhaust opening, an openable but normally closed safety valve secured adjacent the discharge opening of said magazine and normally projecting below said discharge opening, and an air exhaust conduit between said pilot valve exhaust opening and said safety valve, so that said safety valve is opened and said fastening device operated only when said device is in contact with material into which a fastener is to be driven.

10. In a pneumatically operated fastening device having a body formed with a nose portion thereupon, main pressure air inlet and exhaust means, a drive piston and means for returning said drive piston actuated by said pressure air; a safety device which comprises a pilot valve and a pilot valve housing within said body, said pilot valve being normally closed and normally preventing pressure air from reaching said driving means, said pilot valve housing being divided into a lower chamber normally filled with pressure air, an intermediate chamber communicating with said lower chamber, and an upper chamber normally open to atmosphere and also communicating with said drive piston, said pilot valve having a lower portion adjacent said lower chamber, an intermediate portion of smaller operational area than said lower portion, and an upper portion adjacent said upper chamber, said intermediate portion, in closed position, preventing pressure air from flowing from said intermediate chamber to said upper chamber, said upper portion, in open position, preventing pressure air from escaping to atmosphere through said upper chamber and thereby permitting said pressure air to actuate said driving means, a first control valve channel provided with a pilot valve exhaust opening and communicating with the lower chamber of said pilot valve housing, a normally closed first openable control valve within said first control valve channel normally blocking communication between said pilot valve housing and said exhaust opening, a second control valve channel angularly disposed to said first control valve channel and communicating therewith, a spring loaded second control member within said second control valve channel adapted to abut said first control valve and open the same, an openable normally closed safety valve secured to the nose portion of said body and normally projecting downwardly therefrom, and an air exhaust conduit between said pilot valve exhaust opening and said safety valve, so that said safety valve is opened and said fastening device operated only when said device is in contact with material into which a fastener is to be driven.

11. In a pneumatically operated fastening device having a body casing, a magazine secured beneath said body casing and having a discharge opening therewithin, main pressure air inlet and exhaust means, a drive piston and means for returning said drive piston actuated by said pressure air; a safety device which comprises a pilot valve and a pilot valve housing within said body, said pilot valve being normally closed and normally preventing pressure air from reaching said driving means, said pilot valve housing being divided into a lower chamber normally filled with pressure air, an intermediate chamber communicating with said lower chamber, and an upper chamber normally open to atmosphere and also communicating with said drive piston, said pilot valve also having a lower portion adjacent said lower chamber, an intermediate portion of smaller operational area than said lower portion, and an upper portion adjacent said upper chamber, said intermediate portion, in closed position, preventing pressure air from flowing from said intermediate chamber to said upper chamber, said upper portion, in open position, preventing pressure air from escaping to atmosphere through said upper chamber and thereby permitting said pressure air to actuate said driving means, a first control valve channel provided with a pilot valve exhaust opening communicating with the lower chamber of said pilot valve housing, a second closed control valve channel angularly disposed to said first control valve channel and communicating therewith, a normally closed first openable control valve having a head disposed within said first control valve channel and normally blocking communication between said pilot valve housing and said exhaust opening, said first control valve having a first spring member above its head and a stem formed with an intermediate reduced portion extending into said second control valve channel, a second control rod within said second control valve channel abutting the stem portion of said first control valve, a second spring member secured to said second control rod, an openable normally closed safety valve disposed adjacent the discharge opening of said magazine and normally projecting downwardly therefrom, an air exhaust conduit between said pilot valve exhaust opening and said safety valve, wherein said safety valve is opened only when said fastening device is in contact with material into which a fastener is to be driven.

12. In a pneumatically operated fastening device having a body casing, a magazine secured beneath said body casing and having a nose portion provided with a discharge opening therewithin, main pressure air inlet and exhaust means, a drive piston and means for returning said drive piston actuated by said pressure air; a safety device which comprises a pilot valve and a pilot valve housing within said body casing, said pilot valve being normally closed and normally preventing pressure air from reaching said driving means, said pilot valve housing being divided into a lower chamber normally filled with pressure air, an intermediate chamber communicating with said lower chamber, and an upper chamber normally open to atmosphere and also communicating with said drive piston, said pilot valve having a lower portion adjacent said lower chamber, an intermediate portion of smaller operational area than said lower portion, and an upper portion adjacent said upper chamber, said intermediate portion, in closed position, preventing pressure air from flowing from said intermediate chamber to said upper chamber, said upper portion, in open position, preventing pressure air from escaping to atmosphere through said upper chamber and thereby permitting said pressure air to actuate said driving means, a first control valve channel provided with a pilot valve exhaust opening communicating with the lower chamber of said pilot valve housing, a second closed control valve channel angularly disposed to said first control valve channel and communicating therewith, a normally closed first openable control valve having a head disposed within said first control valve channel and normally blocking communication between said pilot valve housing and said exhaust opening, said first control valve having a first spring member above its head and a projecting stem formed with an intermediate reduced portion extending into said second control valve channel; a second control rod within said second control valve channel abutting the stem portion of said first control valve, a second spring member and a handle portion secured to the lower portion of said second control rod, a substantially right angled safety valve channel within the nose portion of said magazine having a horizontal portion and a vertical portion, an openable normally closed safety valve within the vertical portion of said safety valve channel, said safety valve having a head portion; a third spring member above said head portion of said valve, said valve also having a stem portion normally projecting from said nose; a first open elbow member secured to the horizontal portion of said safety valve channel, a second open elbow member secured to the pilot valve exhaust opening, and a flexible open conduit extending between said first elbow and said second elbow, so that said safety valve is opened only when said fastening device is in contact with material into which a fastener is to be driven.

13. A structure as described in claim 12 wherein the stem portion of said safety valve is formed with an inwardly directed substantially right-angled offset portion.

References Cited by the Examiner

UNITED STATES PATENTS

| 710,196 | 9/1902 | Keller | 121—11 |
| 1,586,865 | 6/1926 | Wade | 121—11 |
| 1,590,269 | 6/1926 | Wade | 121—11 |
| 2,899,933 | 8/1959 | Good | 121—11 |
| 2,915,754 | 2/1960 | Wandel | 121—21 |
| 2,923,937 | 2/1960 | Laucher | 121—21 |
| 2,979,725 | 4/1961 | Wandel et al. | 121—11 |
| 3,086,207 | 4/1963 | Lingle | 1—44.4 |

FOREIGN PATENTS

| 455,988 | 2/1928 | Germany. |
| 2,195 | 12/1913 | Great Britain. |

GRANVILLE Y. CUSTER, Jr., *Primary Examiner.*

R. H. BRAUNER, *Examiner.*

J. LABOWSKI, *Assistant Examiner.*